J. G. PUTNAM.

Corn Sheller.

No. 3,270. Reissued Jan'y 19, 1869.

WITNESSES
J. W. Coombs.
R. S. Spencer.

INVENTOR
J. G. Putnam
per Munn & Co.

N. PETERS, Photo-Lithographer, Washington, D. C.

United States Patent Office.

J. G. PUTNAM AND J. SCHIEFFELIN, JR., OF TIOGA, PENNSYLVANIA, ASSIGNEES OF J. G. PUTNAM.

*Letters Patent No.* 28,440, *dated May* 22, 1860; *reissue No.* 3,270, *dated January* 19, 1869

IMPROVEMENT IN CORN-SHELLERS.

The Schedule referred to in these Letters Patent and making part of the same.

*To all whom it may concern:*

Be it known that J. G. PUTNAM, of Tioga, in the county of Tioga, and State of Pennsylvania, has invented a new and useful Improved Corn-Sheller; and we do hereby declare that the following is a full, clear, and exact description thereof, reference being had to the accompanying drawings, forming a part of this specification, in which—

Similar letters of reference indicate corresponding parts in both figures.

Figure 1:
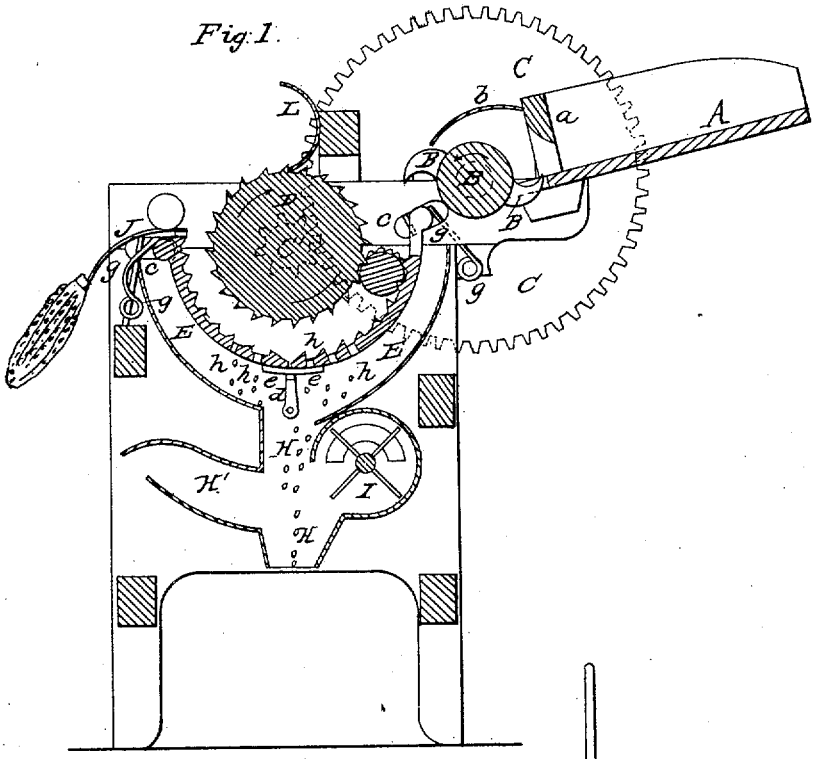
Figure 1 represents a vertical longitudinal section taken through the corn-sheller, showing the several parts employed, and their relative arrangement with each other, for shelling the corn from the cob, and for blowing away the hulls as the grains fall from the machine.
Figure 2:
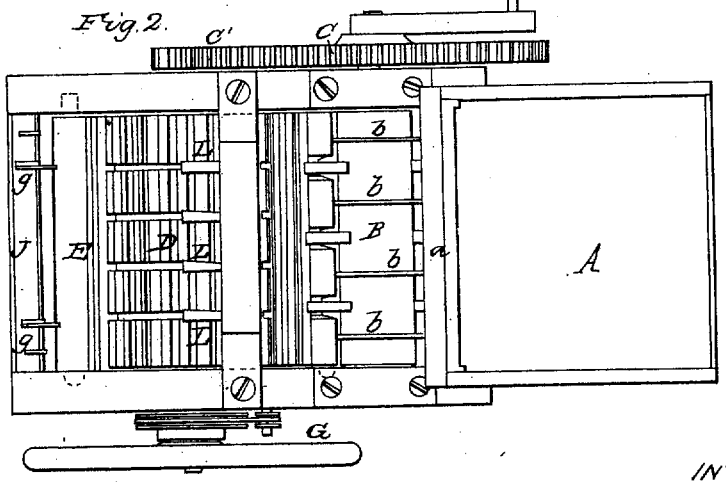
Figure 2 is a top or plan view of the machine.

The main feature of the improvements relates to the mode of constructing and sustaining the concave, between which and the shelling-cylinder the ears of corn pass to be acted upon; and It consists in constructing the same in sections not directly connected each to the other, and each hung independently of the other, in such manner that at any point in its whole surface, including its points of suspension or support, it is free to yield, and recede from the cylinder, under the pressure of the passing ear or cob, whilst also provided with means for restoring itself to its normal position. And in this respect it is distinguishable from all that class in which the concave is hinged or swings from centres or fixed points, and so absolutely precludes the enlargement when the machine is in operation, whatever may be the demands of the work, of the space between it and the cylinder at that point, for it will be observed that, however much the concave may yield at some points, yet if it be not free to yield at all points, and the space between itself and the cylinder anywhere remains a constant, especially throughout the whole length of the concave, or of its sections, the machine will always be liable to derangement, to work badly, or to be broken whenever a cob or other article admitted at one side of its periphery is too large to emerge at the other side.

The invention also consists in other details of construction hereinafter enumerated.

To enable those skilled in the art to fully understand the invention, we will proceed to describe its construction and operation.

In the drawings is shown a suitable stand or framework for supporting the different parts of the machine.

A represents an inclined trough or hopper, from which the ears of corn are to be taken to be carried or fed down from the hopper to the concave.

This trough has a head, *a*, at its lower end, extending across the same, and which allows the ears to pass under it and be received by a rotary feeder, B, which feeder is a shaft furnished with two or more rows of curved teeth B′, arranged diametrically opposite each other on said shaft.

This shaft has imparted to it a comparatively slow motion from a large tooth-wheel, C.

Above the feeding-shaft B are arranged curved elastic prongs *b b*, which project from and are secured to the head *a*, and which reach over the shaft B, and between the teeth B′.

As the shaft B rotates in the direction of the arrow shown in fig. 1, the ears of corn in the hopper A, which are held against this shaft by their own gravity, are taken by the curved teeth on the shaft and drawn up under the prongs *b*, which keep the ears close against the teeth, and at the same time prevent the teeth from drawing away from the hopper too many ears at one time, the prongs *b* also serving very effectually to present the corn properly to the shelling-cylinder.

After the ears of corn leave the feeder, as just described, they are received between the shelling-cylinder D and the concave E, the acting surfaces of both of which are furnished with teeth or ribs, resembling, in cross-section, as seen in fig. 1, ordinary saw-teeth; or any other suitably-shaped shelling-teeth may be used, if found better adapted for this purpose.

The cylinder D has its bearings in the sides of the machine, and is rotated by the wheel C, which engages with a pinion, C′, on the cylinder-shaft.

The motion of this cylinder is regulated or equalized by a balance or fly-wheel, G, on the other end of the shaft, and the cylinder turns in the direction of the arrows indicated thereon in fig. 1.

The concave E is also provided with teeth or ribs, as above stated, and, as a whole, is semi-cylindrical; but it is separated longitudinally into parts or sections, each of which is hung in slots *c*, in the frame of the machine, as clearly shown in fig. 1.

These parts or sections, when more than two are used, may rest on suitable springs, if found better adapted for that purpose, and they are shown as held up or kept in working-proximity to each other at their lower ends by straight or other appropriate springs *d*, which press upwards against strips *e*, which are secured to the bottom of one section of the concave, and project pretty well under the other section.

The springs *d* act upwards, or against the strips *e*, with sufficient force to keep the sections together, and allow them to give, or yield, and adapt themselves to the different-sized ears of corn which pass through the machine to be shelled.

The sides of each section of the concave are not supported, as has heretofore been practised, in fixed positions, or in ordinary journal-bearings, but are suspended or supported in the slots *c*, so as to yield to pressure, and shift the points of suspension, as the needs of the machine, when in operation, may require and they are acted upon, so as to force them towards the cylinder, by springs *g*, similar to those lettered *d*. The concave is thus made yielding at all points; but the whole, and also each section thereof, are held against the ears with sufficient force to effect the shelling perfectly from the points to the buts of the ears, for the universal yield, so to speak, of the concave, hung and acting as above described, permits the teeth to act, and insures their acting upon all parts of the ear, and overcomes the difficulty heretofore encountered in the effort to clean, between two parallel surfaces, the kernels from cobs, which are always of varying diameter, largest usually towards their centres, and tapering at the end.

The grains or kernels of shelled corn pass out through perforations *h* through the bottom of the concave, and are conducted down through a channel, H. to the point of discharge.

While they are thus being conducted away from the machine, they receive a blast of air from fan I, and the dust, hulls, &c., are blown out through the channel H'.

The corn is thus received, free of extraneous matter, into a suitable receiver placed under the spout H.

The cobs, after the grain is removed, are discharged over a curved guard-plate, J, but on account of the swift motion of the shelling-cylinder, they would be very apt to be carried over this cylinder and delivered again into the mouth of the machine, thus passing again through the machine; and to obviate this there is arranged a number of curved guards, L, over the shelling-cylinder, the lower ends of which press in annular grooves in said cylinder. These guards receive any cobs which may be carried up, and effectually prevent their being carried over the cylinder.

The fan I is set in motion by a band which passes over a grooved pulley on the shelling-cylinder shaft.

What we claim as the invention of J. G. PUTNAM, and desire to secure by Letters Patent, is—

1. A divided, yielding perforated concave bed, each section of which is disconnected from the next, and so arranged in the machine as to be free at all points to yield and recede from the cylinder, and also to turn upon both its longitudinal and transverse imaginary axes, substantially as and for the purpose set forth.

2. The combination of the shelling-cylinder, divided yielding perforated concave and elongated journal-slots *c*, to allow the shifting of the journals of the concave sections, substantially as shown and described.

3. The arrangement of the divided, yielding perforated concave E, feeder B, prongs *b*, guard-plate J, guard L, and shelling-cylinder D, as and for the purpose herein shown and described.

J. G. PUTNAM.
J. SCHIEFFELIN, JR.

Witnesses:
F. A. WILLIAMS,
E. E. CLAPP.